United States Patent
Fukui

(10) Patent No.: US 11,735,977 B2
(45) Date of Patent: Aug. 22, 2023

(54) MOTOR AND MANUFACTURING METHOD OF MOTOR

(71) Applicant: MINEBEA MITSUMI Inc., Nagano (JP)

(72) Inventor: Yasushi Fukui, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 231 days.

(21) Appl. No.: 17/058,212

(22) PCT Filed: May 13, 2019

(86) PCT No.: PCT/JP2019/018857
§ 371 (c)(1),
(2) Date: Nov. 24, 2020

(87) PCT Pub. No.: WO2019/230348
PCT Pub. Date: Dec. 5, 2019

(65) Prior Publication Data
US 2021/0194315 A1 Jun. 24, 2021

(30) Foreign Application Priority Data

May 30, 2018 (JP) .................. 2018-103907

(51) Int. Cl.
*H02K 7/00* (2006.01)
(52) U.S. Cl.
CPC .................... *H02K 7/003* (2013.01)
(58) Field of Classification Search
CPC ...................................... H02K 7/003
USPC ........................................ 310/75 D
See application file for complete search history.

(56) References Cited

U.S. PATENT DOCUMENTS

| 5,547,123 A * | 8/1996 | Gumbert ................. B23K 26/60 |
| | | 228/173.6 |
| 2004/0071504 A1 * | 4/2004 | Harada ................... F16D 1/072 |

FOREIGN PATENT DOCUMENTS

| CN | 102315745 A | | 1/2012 | |
| CN | 104057215 | * | 2/2017 | .......... B23K 35/362 |
| CN | 107052550 | * | 8/2017 | ............ B23K 10/02 |
| JP | 06-033277 A | | 2/1994 | |
| JP | 07-303971 A | | 11/1995 | |
| JP | 10-235482 A | | 9/1998 | |
| JP | 2000-324753 A | | 11/2000 | |
| JP | 2004-090030 A | | 3/2004 | |
| JP | 2005-057827 A | | 3/2005 | |
| JP | 3655492 B2 | | 6/2005 | |
| JP | 2006-272425 A | | 10/2006 | |

(Continued)

OTHER PUBLICATIONS

International Search Report for corresponding International Application No. PCT/JP2019/018857 dated Jun. 11, 2019.

(Continued)

*Primary Examiner* — Terrance L Kenerly
(74) *Attorney, Agent, or Firm* — Pearne & Gordon LLP

(57) ABSTRACT

Provided is a motor including a shaft welded to or fused with a metallic member. The motor includes a shaft (5) made of metal and a base including a metal board (81) covered with a coating layer (83). The coating layer (83) has an opening (83*b*), and the metal board (81) includes a recessed part (84) exposed through the opening (83*b*). An outer peripheral part of the shaft (5) and the recessed part (84) are fused or welded together.

8 Claims, 5 Drawing Sheets

(56) References Cited

FOREIGN PATENT DOCUMENTS

| | | | | |
|---|---|---|---|---|
| JP | 2010-039337 A | 2/2010 | | |
| JP | 2011-033754 A | 2/2011 | | |
| JP | 2015-056931 A | 3/2015 | | |
| KR | 20150002999 | * | 1/2015 | ........... B23K 26/703 |

OTHER PUBLICATIONS

Written Opinion for corresponding International Application No. PCT/JP2019/018857 dated Jun. 11, 2019.
Notice of Reasons for Refusal dated Mar. 8, 2022 in the corresponding Japanese Application No. 2018-103907 and English translation.
English translation of the Written Opinion for corresponding International Application No. PCT/JP2019/018857 dated Jun. 11, 2019.
International Preliminary Report on Patentability for corresponding International Application No. PCT/JP2019/018857 dated Dec. 10, 2020.
First Office Action dated Dec. 1, 2022 in the corresponding Chinese Application No. 201980034603.4 and English translation.
Second Office Action dated Apr. 24, 2023 in the corresponding Chinese Application No. 201980034603.4 and English translation.

* cited by examiner

MOTOR AND MANUFACTURING METHOD OF MOTOR

TECHNICAL FIELD

The present invention relates to a motor and a method for manufacturing a motor, and particularly relates to a motor including a shaft welded to or fused with a metallic member and a method for manufacturing such a motor.

BACKGROUND ART

It is known that in a structure of some conventional motors, a shaft is welded to or fused with a metallic member.

Patent Literature 1 shown below discloses performing laser welding to join a shaft of a rotator of a motor or a similar machine to a flat plate by irradiating a joint between the shaft and the flat plate with laser beams while rotating the flat plate.

DOCUMENT LIST

Patent Literature

Patent Literature 1: Japanese Patent Application Publication No. 2004-090030

SUMMARY OF INVENTION

Technical Problem

It is an object of the present invention to provide a motor including a shaft welded to or fused with a metallic member and a method for manufacturing such a motor.

Solution to Problem

A motor according to an aspect of the present invention, accomplished to attain the object described above, includes: a shaft made of metal; and a base including a metallic member covered with a coating layer, wherein the coating layer has an opening, the metallic member includes an exposed part exposed through the opening, and an outer peripheral part of the shaft and the exposed part are fused or welded together.

Preferably, the outer peripheral part of the shaft has a recessed face extending in a peripheral direction, and the recessed face and the exposed part are fused or welded together.

Preferably, the outer peripheral part of the shaft has a cylindrical face, the recessed face and the cylindrical face are lined in a longitudinal direction of the shaft, and the recessed face is entirely inside the cylindrical face in a radial direction.

Preferably, the base is formed with a resin member, and wiring is formed at the resin member.

Preferably, the coating layer contains zinc.

Preferably, the shaft is made of martensitic stainless steel containing no lead.

Preferably, the motor includes: a rotor able to rotate relative to the shaft; and a polygon mirror attached to the rotor.

Preferably, the motor includes a bearing, wherein the polygon mirror is disposed at the bearing.

A method for manufacturing a motor, according to another aspect of the present invention, includes: a first step of removing a part of a coating layer coating a metallic member covered with the coating layer; and a second step of fusing or welding an outer peripheral part of a shaft made of metal to an exposed part of the metallic member, the exposed part being exposed in the first step.

Preferably, in the first step, a hole is formed in the metallic member by a cutting tool and the coating layer around the hole is cut to partially remove the coating layer, and in the second step, the outer peripheral part of the shaft inserted into the hole and the exposed part are fused or welded together.

According to these aspects of the present invention, a motor including a shaft welded to or fused with a metallic member and a method for manufacturing such a motor may be provided.

DESCRIPTION OF EMBODIMENTS

Hereinafter, an embodiment of the present invention will be described with reference to the drawings.

For the present embodiment, a description is given of a motor (a polygon mirror scanner motor) designed to rotate a polygon mirror used for laser scanning by a laser beam printer or other devices.

Embodiment

Figure 1:
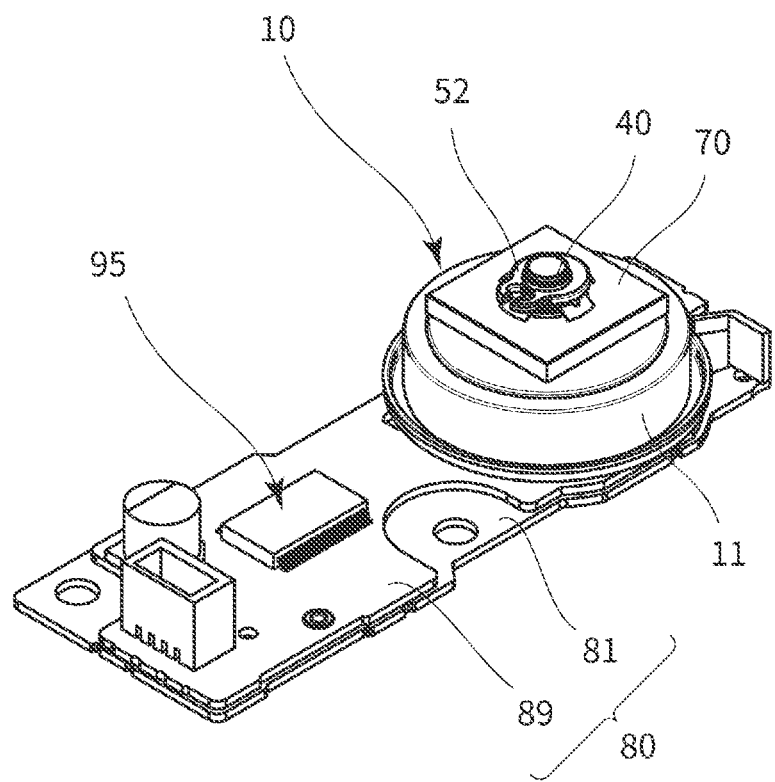
FIG. 1 A perspective view illustrating an example of a motor according to an embodiment of the present invention.
Figure 2:
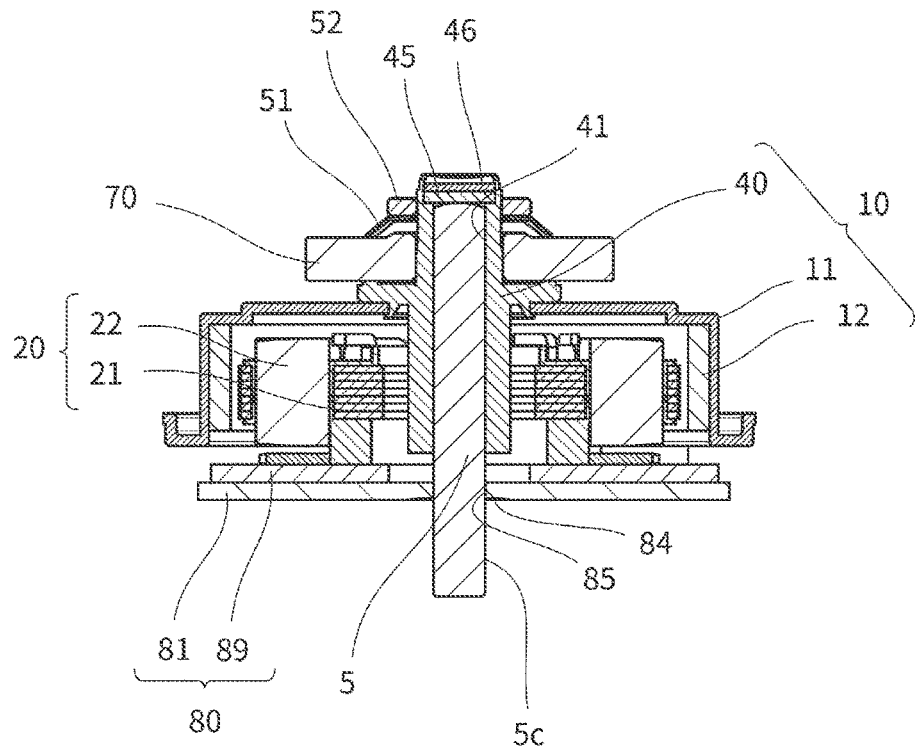
FIG. 2 A cross-sectional view of the motor.

FIG. 1 is a perspective view illustrating an example of a motor 1 according to an embodiment of the present invention. FIG. 2 is a cross-sectional view of the motor 1.

In the following description, a direction away from a polygon mirror 70 and toward a base plate 80 along a shaft 5 (a downward direction in FIG. 2) may be referred to as a downward direction and a direction away from the base plate 80 and toward the polygon mirror 70 along the shaft 5 (an upward direction in FIG. 1) may be referred to as an upward direction.

With reference to FIGS. 1 and 2, the motor 1 according to the present embodiment is used to drive the polygon mirror 70 attached to a rotor 10. The motor 1 mainly includes the shaft 5, the rotor 10, a stator 20, the polygon mirror 70, and the base plate 80.

The shaft 5 is fixed to the base plate 80. The stator 20 is disposed above the base plate 80. The rotor 10 is attached to the shaft 5 so as to be rotatable relative to the shaft 5.

The rotor 10 includes a frame 11, a magnet 12, and a sleeve 40 (an example of a bearing).

The frame 11 is for preventing leakage of a magnetic field from inside the frame 11 and is, for example, made from a magnetic body. The frame 11 has a part extending in a direction perpendicular to the shaft 5 (an outer peripheral direction, a lateral direction in FIG. 2) and a part extending in a direction parallel to the shaft 5 (an up-down direction in FIG. 2) to constitute a side wall. The frame 11 has a cylindrical shape having a closed upper portion and an opening at the bottom.

The magnet 12 is annular and, more specifically, has a cylindrical shape. The magnet 12 is attached to an inner wall surface of an outer peripheral part of the frame 11.

The sleeve 40 extends in the up-down direction so as to pass through a central part of the frame 11. The sleeve 40 is fixed to a hole formed in a middle of an upper surface of the frame 11. The polygon mirror 70 is fixed to an upper portion of the sleeve 40. A middle of the sleeve 40 forms a cylindrical part 41 as a tubular portion, and the shaft 5 is inserted inside the cylindrical part 41. A gap between the sleeve 40 and the shaft 5 is, for example, filled with a lubricant to form a dynamic fluid pressure bearing in a radial direction. This enables the rotor 10 to rotate relative to the shaft 5. An inside of the cylindrical part 41 of the sleeve 40 has herringbone grooves (not illustrated). The herringbone grooves are formed at two locations separately in an axial direction. However, the scope of the present invention is not limited to this example.

A thrust plate 45 and a thrust cover 46 are attached to an upper portion of the cylindrical part 41 of the sleeve 40. The thrust cover 46 covers an upper end portion of the cylindrical part 41. The thrust plate 45 is disposed between the thrust cover 46 and an upper end face of the shaft 5.

The stator 20 includes a stator core 21 having a plurality of teeth formed so as to extend from a middle outward radially and a stator coil 22 wound around the teeth. The stator 20 is disposed on an inner periphery side of the magnet 12 so as to face the magnet 12 through a space. The stator coil 22 generates a magnetic field when an electric current flows in the stator coil. An interaction between the magnetic field of the stator coil 22 and a magnetic field of the magnet 12 generates driving force (force enabling the rotor 10 to rotate).

The polygon mirror 70 is fixed to the upper portion of the sleeve 40 and is positioned above the frame 11. The polygon mirror 70 is arranged between a spring 51 disposed above and a part of the sleeve 40, and is fixed there. A grip ring 52 is disposed in the upper portion of the spring 51, and the position of the up-down direction of the spring 51 is put in proper position by the grip ring 52.

The base plate 80 (an example of a base) has a metal board 81 (an example of a metallic member) and a circuit board 89 (an example of a resin member). The circuit board 89 is layered on an upper surface of the metal board 81 to constitute a single base plate 80.

The circuit board 89 is, for example, a printed wiring board. The printed wiring board is a resin member, and wiring is formed on the resin member. The resin member is, for example, made of an epoxy resin. An electronic component 95 is populated at an upper surface (a surface on an upper side in FIG. 1) of the circuit board 89 via solder. The electronic component 95, for example, includes a drive and control integrated circuit to drive and control the motor. The electronic component 95 is joined to the upper surface of the circuit board 89 with solder. A variety of circuit elements, other than the integrated circuit, may be disposed on the circuit board 89. Such circuit elements are, for example, a Hall element used to detect a rotation angle or a rotation number of the magnet 12 based on a change in magnetic field received from the magnet 12, chip-type circuit elements (a resistor, a capacitor), and a drive integrated circuit (IC) used to turn on or off the application of an electric current to each stator coil 22.

The metal board 81 is, for example, composed of a board made of iron. A hole 85 is formed in the metal board 81. The shaft 5 is inserted into the hole 85. The shaft 5 and the metal board 81 are firmly fixed to each other by laser welding a joint of the shaft 5 and the hole 85 on a lower surface side of the metal board 81, as described later. The motor 1 is manufactured, after the shaft 5 is fixed to the metal board 81, by attaching the circuit board 89 to the metal board 81, and attaching the stator 20 and the rotor 10.

The shaft 5 has a protrusion 5c protruding downward from the base plate 80. When the motor 1 is mounted to a device or another apparatus using the motor 1, the protrusion 5c provided for the motor 1 allows the motor 1 to be put in proper position by fitting the protrusion 5c into a hole formed in the device side. Since an axis of the protrusion 5c coincides with a rotation axis of the polygon mirror 70 of the motor 1, the polygon mirror can be put in proper position readily and precisely with respect to the device using the motor 1.

Figure 3:
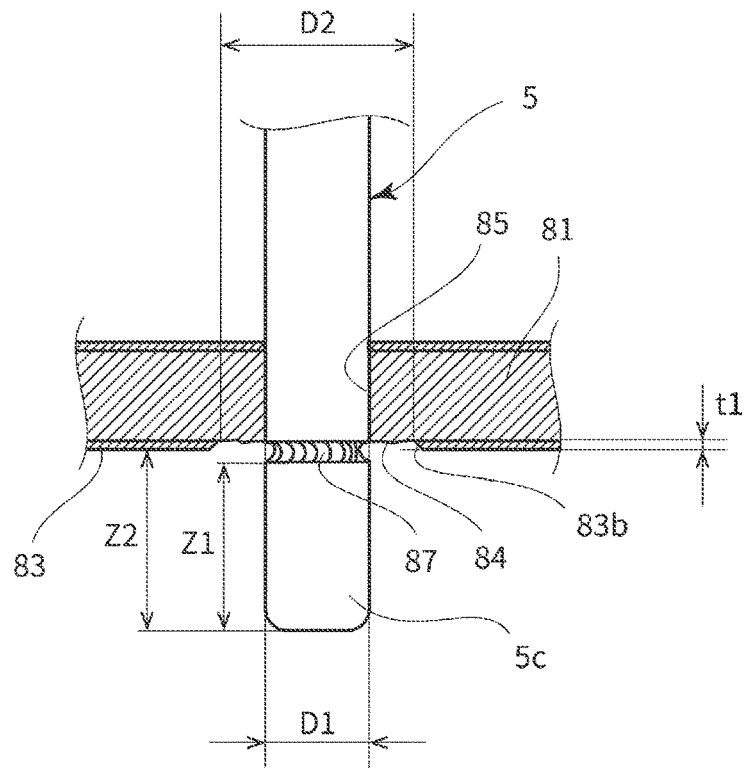
FIG. 3 A cross-sectional view illustrating a part of a joint between a metal board and a shaft.

FIG. 3 is a cross-sectional view illustrating a part of the joint between the metal board 81 and the shaft 5.

In FIG. 3, the metal board 81 and the shaft 5 are shown, and other components are not shown. A cross section of the metal board 81 taken along a central axis of the shaft 5 is shown.

In the present embodiment, the metal board 81 is a sheet of galvanized steel pertinent to Japanese Industrial Standards (JIS) symbols such as "SECC", "SECD", "SECE", "SECF", and "SECG" specified by JIS standard numbers. In other words, a surface of the metal board 81 is covered with a coating layer 83. The metal board 81 has the coating layer 83, the coating layer 83 being a zinc coating layer. The coating layer 83 covers each of the upper surface and a lower surface. The coating layer 83 is provided for anticorrosion purposes. In FIG. 3 and subsequent drawings, the coating layer 83 is schematically shown. The metal board 81 is made from a sheet of galvanized steel. The sheet of galvanized steel is in general circulation and widely available. This contributes to a reduction in manufacturing costs for the motor 1.

The shaft 5 is composed of a metallic member. In the present embodiment, the shaft 5 is made of martensitic stainless steel containing no lead. The shaft 5 is, for example, made of stainless steel pertinent to JIS symbols such as "SUS420F", "SUS420J2", "SUS420J1", "SUS403", "SUS410", "SUS416", "SUS431", and "SUS440C" specified by JIS standard numbers. The shaft 5 has a composition excellent in wear resistance, offers improved machinability, and has no lead added as a constituent (contains virtually no lead). Thus, the martensitic stainless steel containing no lead refers to stainless steel. Stainless steel has no lead added as a constituent (contains virtually no lead). The shaft 5 is made of stainless steel containing manganese as a constituent. This example, however, does not limit the material for the shaft 5.

In FIG. 3, the metal board 81 has a recessed part 84 (an example of an exposed part) in a surface on a lower side of the metal board 81. The recessed part 84 is, for example, a zone having a diameter D2 in size and being recessed upward from the surface of the metal board 81 by a dimension t1. The recessed part 84 is formed to be substantially concentric with the hole 85. A depth of the recessed part 84 (the dimension t1) is slightly greater than a thickness of the coating layer 83. The recessed part 84 is formed by cutting the surface of the metal board 81, as described later.

In other words, because of the recessed part 84 thus formed, the coating layer 83 on the lower side has an opening 83b. To put it another way, the metal board 81 has an exposed part (the recessed part 84) to allow an iron portion not covered with the coating layer 83 to be exposed downwardly through the opening 83b formed in the coating layer 83.

The shaft 5 is inserted into the hole 85 so as to pass through the metal board 81. A diameter D1 of the shaft 5 is slightly smaller than an inner diameter of the hole 85.

For instance, in the present embodiment, the dimension t1 is a dimension ranging from 0.01 mm to 0.1 mm inclusive, the diameter D1 is 2.368 mm±0.0005 mm, and the diameter D2 is a dimension ranging from 3.3 mm to 4.8 mm inclusive. The inner diameter of the hole 85 is a dimension ranging from 2.0 mm to 5.0 mm inclusive.

An outer peripheral part of the shaft 5 protruding downward from the hole 85 and the recessed part 84 are welded by laser welding. The welding is applied to an entire periphery of the shaft 5. Owing to the welding, a recessed face 87 recessed in a radial direction is formed at an upper end portion of a part of the shaft 5 protruding downward from the recessed part 84. The recessed face 87 extends in a peripheral direction along the shaft 5. The recessed face 87 extends in a peripheral direction throughout the periphery of the shaft 5. A welding mark is formed at a surface of the recessed face 87. An alloy formed when welding appears as a welding mark at a surface of the recessed part 84 in a neighborhood of the shaft 5. In other words, the recessed face 87 and the recessed part 84 are welded and joined to each other.

The outer peripheral part of the shaft 5 has a cylindrical face. The protrusion 5c and the recessed face 87 are lined in a longitudinal direction of the shaft 5. The recessed face 87 is entirely inside a cylindrical face of the protrusion 5c in a radial direction. In other words, of the part where the recessed face 87 is formed, no part of the recessed face 87 is outside an outer peripheral surface of the shaft 5 having the diameter D1.

In this way, the recessed face 87 is formed at the shaft 5. Thus, in a dimension Z2 of the shaft 5 protruding downward from the lower surface of the metal board 81, the cylindrical face of the shaft 5 formed with high precision is ensured throughout a dimension Z1 other than a part of a dimension along the up-down direction of the recessed face 87. This allows the motor 1 to be put in proper position with high precision using the protrusion 5c because the dimension Z1 of the cylindrical face of the shaft 5 in the up-down direction can be ensured to a relatively large extent. The device having the motor 1 can be downsized because the dimension Z2 of the shaft 5 protruding downward can be made relatively small.

In a manufacturing process for the motor 1, the shaft 5 is fixed to the metal board 81 in steps described below. The motor 1 is manufactured, after the shaft 5 is fixed to the metal board 81 as described below, by attaching the circuit board 89 implemented with the electronic component 95 and other elements to the metal board 81, and attaching the stator 20 and the rotor 10 to the base plate 80.

Figure 4:
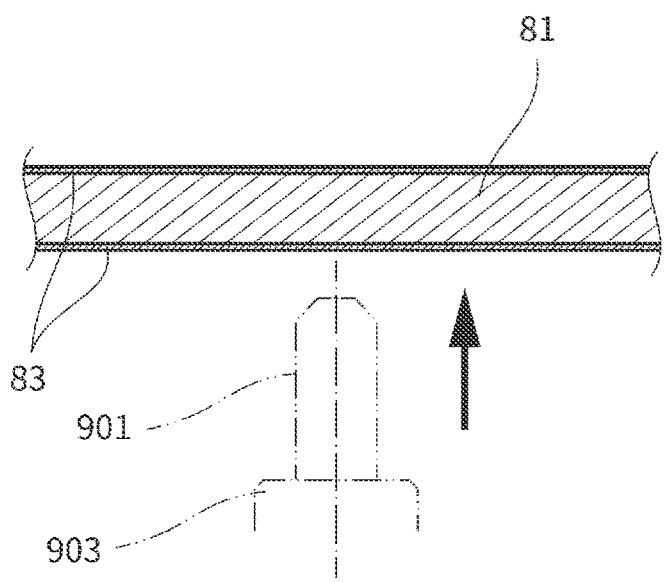
FIG. 4 A first drawing illustrating a manufacturing process for a motor.

FIG. 4 is a first drawing illustrating a manufacturing process for the motor 1.

First, as illustrated in FIG. 4, the hole 85 is formed in the metal board 81 by a cutting tool 901 such as a drill, an end mill, and a reamer. Together with the formation of the hole 85, the coating layer 83 around the hole 85 is cut to partially remove the coating layer 83. This forms the recessed part 84 together with the hole 85. The coating layer 83 can be partially removed in the same step for the formation of the hole 85, for example, by processing the metal board 81 from underneath using a second cutting tool 903 coaxially arranged with the cutting tool 901, the second cutting tool 903 being, for example, an end mill or a file. This helps shorten the manufacturing process. The formation of the hole 85 and the removal of the coating layer 83 (the formation of the recessed part 84) may be performed in separate steps. The tools and the technique used for the formation of the hole 85 and the removal of the coating layer 83 are not limited to the examples described above. For instance, the hole 85 may be formed by press working.

Figure 5:
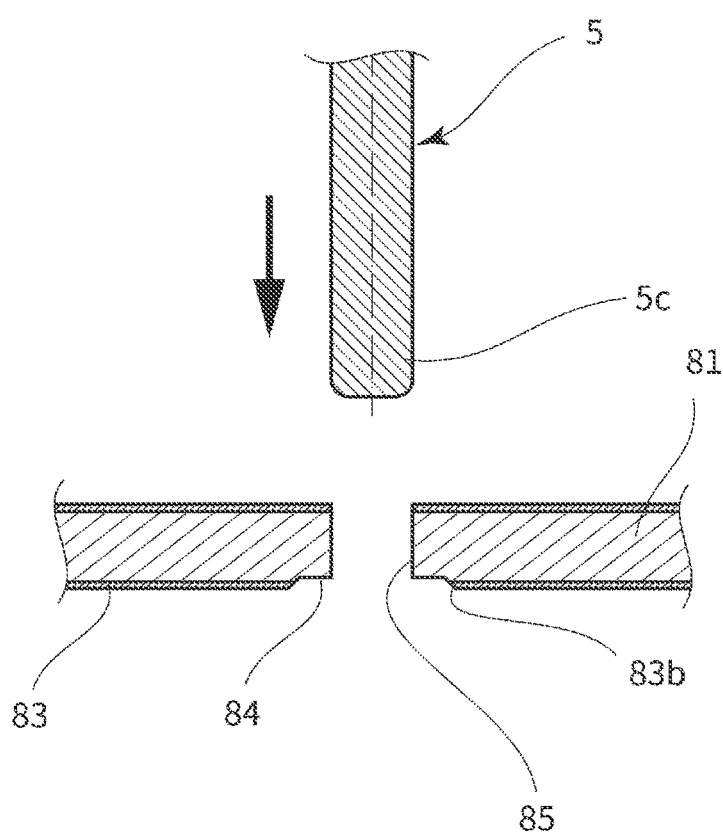
FIG. 5 A second drawing illustrating the manufacturing process for the motor.

FIG. 5 is a second drawing illustrating the manufacturing process for the motor 1.

Thereafter, as illustrated in FIG. 5, the shaft 5 is inserted into the hole 85. The shaft 5 is preferably inserted from above the metal board 81.

Figure 6:
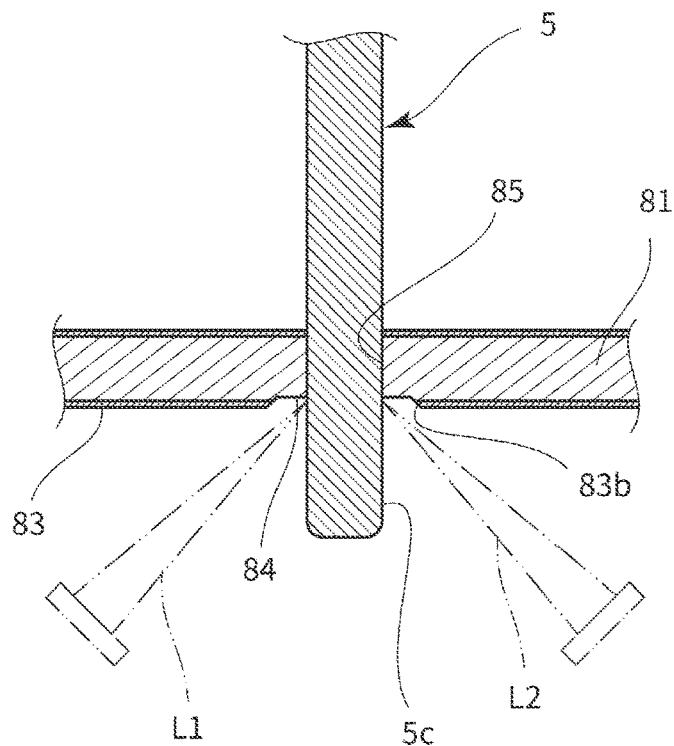
FIG. 6 A third drawing illustrating the manufacturing process for the motor.

FIG. 6 is a third drawing illustrating the manufacturing process for the motor 1.

Subsequently, as illustrated in FIG. 6, with part of the shaft 5 being inserted into the hole 85, laser welding of the outer peripheral part of the shaft 5 and the recessed part 84, as an exposed part, is performed. During welding, the metal board 81 and the shaft 5 are rotated relative to two lasers L1 and L2 such that two places in the neighborhood of a joint between the recessed part 84 close to the hole 85 and the shaft 5 are points irradiated with beams from the respective lasers L1 and L2. For instance, the metal board 81 and the shaft 5 are rotated around the shaft 5 by 180 degrees without any change in positions of the lasers L1 and L2 such that the points irradiated with beams from the two respective lasers L1 and L2 are 180 degrees apart from each other around the shaft 5. This means that the outer peripheral part of the shaft 5 and the recessed part 84 are welded together around the entire periphery and the shaft 5 may be fixed to the metal board 81. Laser welding is preferably performed with the shaft 5 and the metal board 81 being upside down (the protrusion 5c of the shaft 5 positioned so as to face upward).

Figure 7:
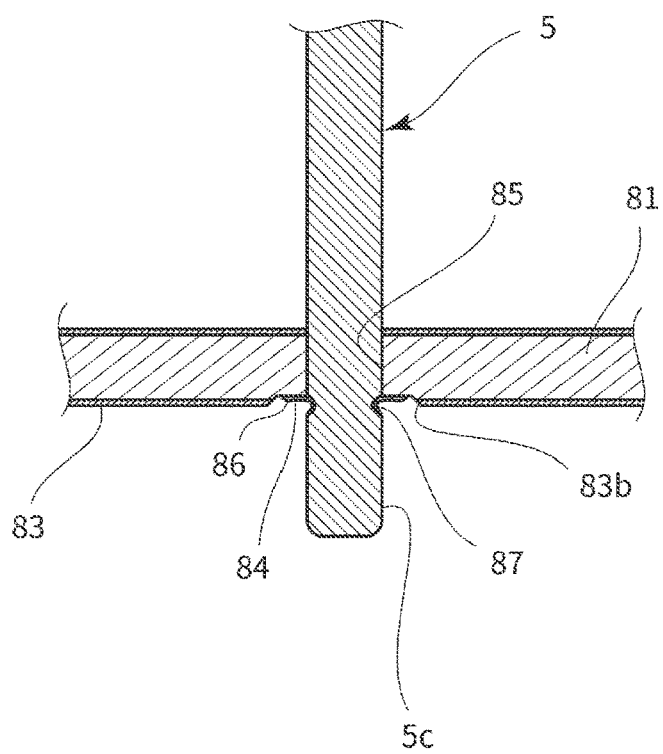
FIG. 7 A fourth drawing illustrating the manufacturing process for the motor.

FIG. 7 is a fourth drawing illustrating the manufacturing process for the motor 1.

In FIG. 7, a condition after the laser welding is performed is schematically illustrated. Because of the laser welding being performed, a portion of the outer peripheral part of the shaft 5 and a portion of the recessed part 84 melt to constitute a welded part 86 forming a welding mark. Since a part of the shaft 5 melts and is carried to constitute the welded part 86, the recessed face 87 is formed on the outer peripheral surface of the shaft 5. In the recessed part 84, the welded part 86 extends in a radial direction from the neighborhood of the hole 85. The welded part 86 stays inside the recessed part 84. In other words, a size of the recessed part 84 is set such that the welded part 86 does not extend in a radial direction beyond the recessed part 84. This prevents the welded part 86 from protruding from the surface of the metal board 81, and allows the motor 1 to be put in proper position with increased precision with the surface of the metal board 81 as a reference surface.

In the present embodiment, as described above, the motor 1 is formed by a manufacturing method including a step of removing part of the coating layer 83 of the metal board 81 covered with the coating layer 83 and a step of welding the outer peripheral part of the shaft 5 made of metal to the recessed part 84 of the metal board 81, the recessed part 84 having been exposed in the removing step. In other words, in the structure of the motor 1, the recessed part 84 of the metal board 81 and the outer peripheral part of the shaft 5 are welded together. The shaft 5 is directly fixed to the metal board 81 by welding. This allows the shaft 5 to be firmly fixed while getting rid of a component substantially protruding to the lower surface of the metal board 81. This allows the reliability of the motor 1 to be improved. This also allows the motor 1 to be thinned. This contributes to a reduction in manufacturing costs for the motor 1.

If when welding a shaft 5 to a metal board 81 covered with a coating layer 83, the coating layer 83 melts or evaporates, the melted or evaporated coating layer can adhere to the outer peripheral part of the shaft 5, resulting in an undulation at the outer peripheral part of the protrusion 5c. For instance, if the coating layer 83 is a zinc coating layer, melting of the coating layer 83 generates tin. The tin may adhere to the outer peripheral part of the shaft 5. This can cause difficulty in putting the motor 1 in proper position using the protrusion 5c. If stainless steel with a relatively high manganese content is used as the material for the shaft 5, the manganese has a relatively low melting point, and tends to evaporate. In this case, the melting or evaporation of the shaft 5 may cause foreign matter to adhere to the outer peripheral part of the shaft 5, and the problem described above may occur more noticeably.

By contrast, in the present embodiment, the coating layer 83 is removed from a portion of the metal board 81 to form the recessed part 84, and the recessed part 84 is directly welded to the shaft 5. This precludes the coating layer 83 and other elements from melting or evaporating, and thus can prevent the occurrence of the problem described above.

By appropriately adjusting points irradiated with beams from the lasers L1 and L2 for laser welding, and an angle, intensity, and other properties of the lasers L1 and L2 for laser welding, a melted area may be made smaller on the shaft 5 and the metal board 81. For instance, the points irradiated with beams from the lasers L1 and L2 may be made closer to a part of the shaft 5 in the neighborhood of the hole 85. This allows the shaft 5 to be reliably fixed to the metal board 81 with relatively low output of the lasers L1 and L2.

Figure 8:
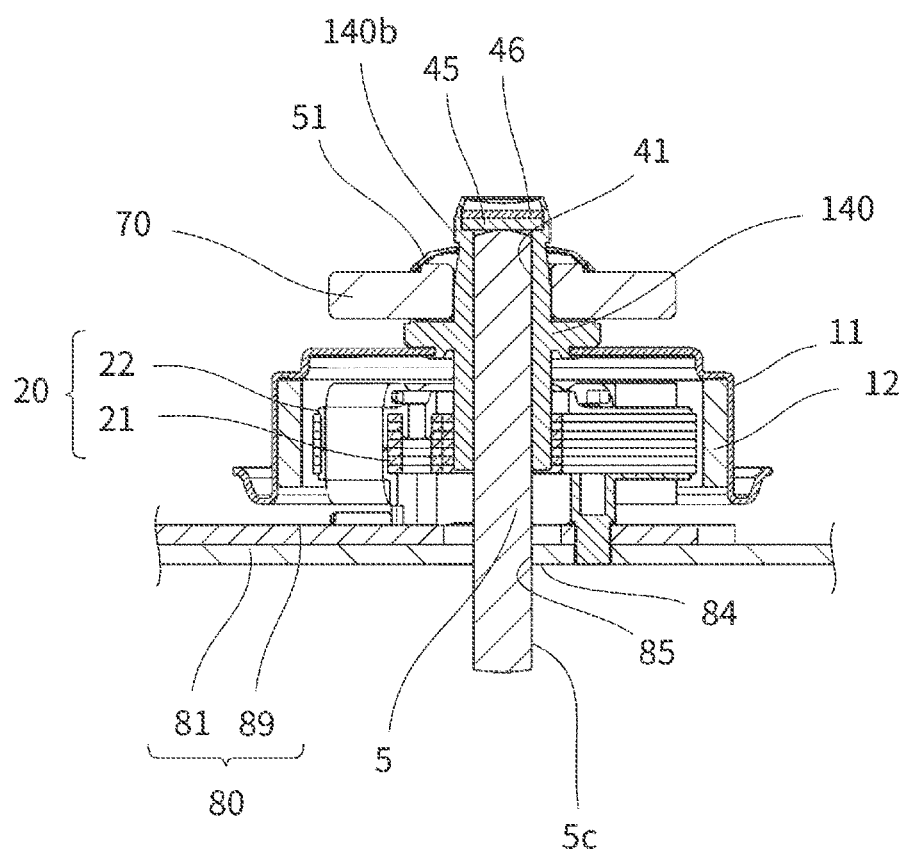
FIG. 8 A cross-sectional view of a motor according to a modification example of the present embodiment.

FIG. 8 is a cross-sectional view of a motor 101 according to a modification example of the present embodiment.

As illustrated in FIG. 8, the motor 101 and the motor 1 according to the embodiment described above differ in a method for fixing the polygon mirror 70. In other words, in the motor 101, the spring 51 is put in proper position in the up-down direction by a protruding part 140b. The protruding part 140b is formed on an upper portion of a sleeve 140 so as to protrude in a radial direction. In such a structure, the need for providing a grip ring or a similar part to put the spring 51 in proper position is eliminated, and a number of components of the motor 101 may be reduced.

[Others]

The shaft and the recessed part of the metal board may be joined to each other by fusing. Alternatively, these parts may be welded together by a method other than laser welding.

A configuration of the components of the motor is not limited to the configuration shown in the above-described embodiment. Different configurations designed to suit the object of the present invention may be applied.

The base plate is not limited to one including the metal board and the circuit board put together. The base plate may be a base plate including wires laid on an insulating layer put on a metal board, and is not limited to the composition of the layers such as in the embodiment described above, and may be a base plate having more layers.

The motor is not limited to a motor to rotate the polygon mirror as described above. The structure for attaching the shaft to the base plate shown in the above-described embodiment can be applied to motors including base plates and being used for various purposes.

It should be construed that the embodiment described above is illustrative in all aspects, and is not restrictive. The scope of the present invention is represented by the scope of the claims and not by the above description, and it is intended that all modifications within the sense and scope equivalent to the claims are included in the scope of the present invention.

LIST OF REFERENCE SIGNS 1, 101 motor,
5 shaft,
10 rotor,
40, 140 sleeve (an example of bearing),
70 polygon mirror,
80 base plate (an example of base),
81 metal board (an example of metallic member),
83 coating layer,
83b opening,
84 recessed part (an example of exposed part),
85 hole,
86 welded part,
87 recessed face,
89 circuit board (an example of resin member)

The invention claimed is:

1. A motor comprising:
a shaft made of metal, and
a base including a coating layer and a metallic member covered with the coating layer,
wherein an outer peripheral part of the shaft includes a cylindrical face and a recessed face extending in a peripheral direction,
wherein the coating layer has an opening,
the metallic member includes an exposed part exposed through the opening,
the recessed face of the shaft and the exposed part are fused or welded together,
the recessed face is arranged in a base side with respect to the cylindrical face in a longitudinal direction of the shaft,
a welded part between the recessed face and the exposed part is arranged inside the exposed part,
the welded part is arranged in the recessed face side with respect to a face of the cylindrical face side in the longitudinal direction of the shaft,
the cylindrical face and the face of the base in the cylindrical face side are reference surfaces.

2. The motor according to claim 1, wherein the metallic member is a plate.

3. The motor according to claim 1, wherein
the recessed face is entirely inside the cylindrical face in a radial direction.

4. The motor according to claim 1, wherein the base is formed with a resin member, and wiring is formed at the resin member.

5. The motor according to claim 1, wherein the coating layer contains zinc.

6. The motor according to claim 1, wherein the shaft is made of martensitic stainless steel containing no lead.

7. The motor according to claim 1, comprising:
a rotor able to rotate relative to the shaft; and
a polygon mirror attached to the rotor.

8. The motor according to claim 7, comprising a bearing, wherein the polygon mirror is disposed at the bearing.

* * * * *